INVENTOR.
EMIL L. MARTIN JR.
BY
ATTORNEY 3,135,936
MOVABLE SLUG INDUCTOR TUNED TANK CIRCUIT HAVING CAPACITOR MEANS COMPENSATING MECHANICAL VIBRATION
Emil L. Martin, Jr., Cedar Rapids, Iowa, assignor to Collins Radio Company, Cedar Rapids, Iowa, a corporation of Iowa
Filed Oct. 10, 1962, Ser. No. 229,695
5 Claims. (Cl. 334—68)

This invention relates in general to tuning means and in particular to a means for compensating a variable inductor for frequency changes occurring from vibration of a tuning slug.

Variable inductors are often used in which a coil has a lead screw driven slug. The coil might form a part of the resonant circuit of an oscillator. Inductance changes due to backlash in the lead screw and resulting vibration of slug will cause the inductance of the coil to change. Movements as small as a few millionths of an inch cause inductance changes. It is an object to compensate inductors for inductance changes caused by vibration.

Figure 1:
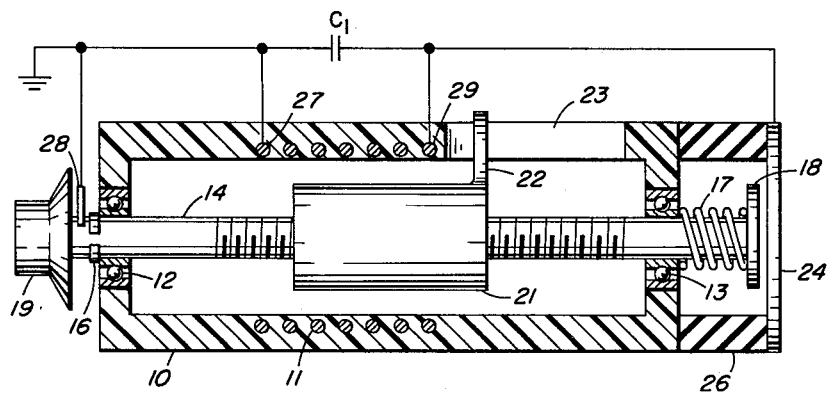
Figure 2:
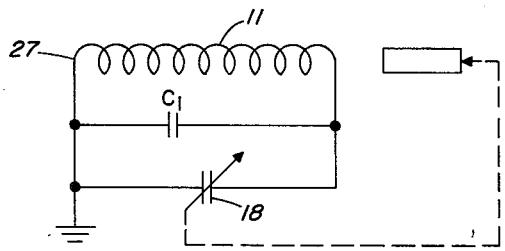

Further objects, features and advantages of the invention will become apparent from the following description and claims when read in view of the drawings, in which FIGURE 1 is a view showing a variable inductor of this invention, and FIGURE 2 is a schematic showing the compensated coil.

FIGURE 1 shows a frame member 10 of insulating material in which is mounted a coil 11. The coil may be imbedded in molded plastic which forms the frame 10. Bearings 12 and 13 are mounted in a frame 10 at opposite ends and rotatable support lead screw shaft 14. A C-clip 16 fits into a groove on shaft 14 and bears against bearing 12. A spring 17 is mounted about the other end of lead screw 14, and is in compression between the bearing 13 and a first condenser plate 18 which is attached to the end of shaft 14. Spring 17 biases shaft 14 to the right relative to FIGURE 1. A knob 19 is attached to the opposite end of shaft 14. The portion of shaft 14 between bearings 12 and 13 is threaded and carries an internally threaded tuning slug 21, which may be moved in and out of the coil 11 by rotation of the lead screw. An arm 22 extends from one end of core 21 and moves in a slot 23 formed in frame member 10 and prevents the core from rotating when the lead screw is turned. Thus the core will move into and out of the coil as the lead screw is rotated.

A second capacitor plate 24 is supported from frame 10 by collar 26. One end 27 of coil 11 is connected to ground and to a brush 28 which slidably engages lead screw 14. Since lead screw 14 is made of an electrical conducting material this connects capacitor plate 18 to end 27 of the coil 11. The other end 29 of the coil is connected to second capacitor plate 24. A resonating capacitor $C_1$ is also connected across coil 11 to form a resonator. For a particular inductor, plate 18 was one half inch in diameter and the spacing between plates was 0.010 inch.

The capacitance between plates 18 and 24 is defined by the following formula:

$$C = \frac{0.224}{l} KS \qquad (1)$$

where
$C$=capacitance in micromicrofarads
$K$=dielectric constant (1 for air)
$S$=area of plate in square inches
$l$=spacing in inches between plates 18 and 24 then $$\frac{dC}{dl} = -\frac{0.224\ KS}{l^2} = -\frac{C}{l} \qquad (2)$$

The change of capacitance for a given change in spacing can be adjusted by varying $C$ or $l$ and can be made to offset the change in resonant frequency of the $L/C$ resonator caused by a change in the inductance resulting from vibration induced motion of the slug.

$$f^2 = \frac{25330}{LC}$$

where
$f$=frequency in mc.
$L$=inductance in $\mu$h.
$C$=capacitance in $\mu\mu f$.

Relative to FIGURE 1 if the slug moved to the right the inductance would decrease. However, the spacing between plates 18 and 24 of the compensator capacitor would also decrease thereby increasing the capacitance. If the proportions are correct then the LC ratio will not change. Of course, this relation holds for very small movements, but that is all that is needed since the movement caused by vibration is only a few millionths of an inch.

It is seen that this invention provides a means for compensating a slug tuned inductor for vibration changes.

Although it has been changed with respect to preferred embodiments thereof, it is not to be so limited, as changes and modifications may be made therein which are within the full intended scope of the invention as defined by the appended claims.

I claim:

1. Means for compensating for frequency changes caused by vibration comprising, a frame member, a coil supported by said frame member, a lead screw rotatably supported by the frame member and extending through the coil, an internally threaded slug receivable on the lead screw, means for preventing the slug from rotating relative to the frame member but allowing it to move longitudinally of the coil as the lead screw is rotated, a first capacitor plate attached to one end of the lead screw and electrically connected to one side of the coil, a second capacitor plate supported by the frame member parallel to the first capacitor plate and electrically connected to the other end of the coil.

2. In apparatus according to claim 1 wherein a spring means biases the lead screw in a direction towards the second capacitor plate.

3. In apparatus according to claim 1 wherein the means for preventing the slug from rotating comprises an arm which extends from the core and is received into a slot formed in the frame member.

4. In apparatus according to claim 1 a resonating capacitor connected across the coil.

5. In apparatus according to claim 1 wherein the area of the first capacitor plate and the spacing between the first and second capacitor plate is such that compensation for movement of the lead screw occurs.

References Cited in the file of this patent
UNITED STATES PATENTS 2,516,287   Aske _____ July 25, 1950
2,673,933   Morton _____ Mar. 30, 1954
2,780,727   Dreyer _____ Dec. 5, 1957